(12) United States Patent
Meng et al.

(10) Patent No.: US 11,371,881 B2
(45) Date of Patent: Jun. 28, 2022

(54) PHOTOELECTRIC DETECTION CIRCUIT, PHOTOELECTRIC DETECTION DEVICE AND ELECTRONIC DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Chen Meng, Beijing (CN); Chuncheng Che, Beijing (CN); Wei Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 179 days.

(21) Appl. No.: 16/772,560

(22) PCT Filed: Jul. 31, 2019

(86) PCT No.: PCT/CN2019/098725
§ 371 (c)(1),
(2) Date: Jun. 12, 2020

(87) PCT Pub. No.: WO2021/016953
PCT Pub. Date: Feb. 4, 2021

(65) Prior Publication Data
US 2022/0099485 A1 Mar. 31, 2022

(51) Int. Cl.
*G01J 1/44* (2006.01)
*G09G 3/20* (2006.01)
*G01J 1/42* (2006.01)

(52) U.S. Cl.
CPC ............... *G01J 1/44* (2013.01); *G01J 1/4204* (2013.01); *G09G 3/20* (2013.01); *G09G 2360/144* (2013.01)

(58) Field of Classification Search
CPC . G01J 1/44; G01J 1/4204; G09G 3/20; G09G 2360/144
See application file for complete search history.

(56) References Cited

U.S. PATENT DOCUMENTS

2006/0202947 A1* 9/2006 Lee .................... G09G 3/3648
345/102
2007/0268206 A1 11/2007 Kinoshita et al.
(Continued)

FOREIGN PATENT DOCUMENTS

CN 101180565 A 5/2008
CN 100585475 C 1/2010
(Continued)

OTHER PUBLICATIONS

International Search Report of PCT/CN2019/098725 in Chinese, dated Apr. 24, 2020.
(Continued)

*Primary Examiner* — Que Tan Le
*Assistant Examiner* — Don J Williams
(74) *Attorney, Agent, or Firm* — Collard & Roe, P.C.

(57) ABSTRACT

A photoelectric detection circuit, a photoelectric detection device and an electronic device. The photoelectric detection circuit includes a first detection sub-circuit configured to be exposed to the environment of light to be detected and having an equivalent resistance that varies with the variation of illumination intensity of the light to be detected in the environment; and a second detection sub-circuit configured to be in a state of fixed illumination intensity and having an equivalent resistance that is constant due to the fixed illumination intensity. The first detection sub-circuit is connected in series with the second detection sub-circuit via a first node N1 and the signal output lead Vout is electrically connected with the first node N1 to output detected electrical signals.

20 Claims, 7 Drawing Sheets

(56) References Cited

U.S. PATENT DOCUMENTS

2009/0066897 A1  3/2009  Katoh et al.
2010/0020006 A1  1/2010  Otani

FOREIGN PATENT DOCUMENTS

| CN | 101634765 A | 1/2010 |
|----|-------------|--------|
| CN | 107389188 A | 11/2017 |
| CN | 108981910 A | 12/2018 |
| EP | 3 637 067 A1 | 4/2020 |
| JP | 2000131137 A | 5/2000 |
| JP | 2006118965 A | 5/2006 |

OTHER PUBLICATIONS

Notice of Transmittal of the International Search Report of PCT/CN2019/098725 in Chinese, dated Apr. 24, 2020.
Written Opinion of the International Searching Authority of PCT/CN2019/098725 in Chinese, dated Apr. 24, 2020.
First Office Action in Chinese Application No. 201980001220.7 dated Apr. 6, 2022 with English translation.

\* cited by examiner

PHOTOELECTRIC DETECTION CIRCUIT, PHOTOELECTRIC DETECTION DEVICE AND ELECTRONIC DEVICE

CROSS REFERENCE TO RELATED APPLICATIONS

This application is the National Stage of PCT/CN2019/098725 filed on Jul. 31, 2019, the disclosure of which is incorporated by reference.

TECHNICAL FIELD

Embodiments of the present disclosure relate to a photoelectric detection circuit, a photoelectric detection device and an electronic device.

BACKGROUND

With the development of science and technology and improvements of life, more and more intelligent terminals are entering people's daily life, including for example, smart phones, tablets and liquid crystal TVs. For intelligent terminals with display screens, maintaining high brightness for a long time will increase energy consumption, while displaying under low brightness in environments with strong lighting will impact image quality and users' comfortability.

Therefore, intelligent terminals with display screens generally use ambient light sensors to sense ambient light and inform the processing chips to adjust backlight brightness of the displays automatically so as to reduce power consumption of the products. For example, in applications of handheld mobile devices such as smartphones, tablet computers and global positioning system (GPS) devices, displays consume up to 30% energy of batteries, while using ambient light sensors may lengthen runtime of batteries in a large extent. On the other hand, ambient light sensors help displays to provide soft displayed images. When the ambient brightness is high, displays using ambient light sensors will be adjusted to high brightness automatically. When the external environment is dark, the display will be adjusted to low brightness.

SUMMARY

At least one embodiment of this disclosure provides a photoelectric detection circuit, comprising: a first detection sub-circuit configured to be exposed to an environment of light to be detected and having an equivalent resistance that varies with a variation of illumination intensity of the light to be detected; a second detection sub-circuit configured to be in a state of fixed illumination intensity and having an equivalent resistance that is constant due to the fixed illumination intensity; and a signal output lead, wherein the first detection sub-circuit is connected in series with the second detection sub-circuit via a first node and the signal output lead is electrically connected with the first node to output detected electrical signals.

For example, in the photoelectric detection circuit provided in the at least one embodiment of this disclosure, the first detection sub-circuit comprises a first photoelectric sensing element, the second detection sub-circuit comprises a second photoelectric sensing element, and the first photoelectric sensing element and the second photoelectric sensing element have same electrical characteristics.

For example, in the photoelectric detection circuit provided in the at least one embodiment of this disclosure, the second detection sub-circuit is blocked to prevent light to be detected from the environment from illuminating the second detection sub-circuit such that the second detection sub-circuit is in a state the fixed illumination intensity.

For example, in the photoelectric detection circuit provided in the at least one embodiment of this disclosure, further comprising a first power end and a second power end, wherein a first end of the first photoelectric sensing element is electrically connected to the first power end, a second end of the second photoelectric sensing element is electrically connected to the second power end, and a second end of the first photoelectric sensing element and a first end of the second photoelectric sensing element are both electrically connected to the first node.

For example, in the photoelectric detection circuit provided in the at least one embodiment of this disclosure, an output potential of the first power end is higher than an output potential of the second power end.

For example, in the photoelectric detection circuit provided in the at least one embodiment of this disclosure, an output potential of the first power end and an output potential of the second power end have opposite polarities and equal magnitudes.

For example, in the photoelectric detection circuit provided in the at least one embodiment of this disclosure, further comprising a third power end and a fourth power end, wherein a control terminal of the first photoelectric sensing element is electrically connected to the third power end; and a control terminal of the second photoelectric sensing element is electrically connected to the fourth power end.

For example, in the photoelectric detection circuit provided in the at least one embodiment of this disclosure, an output potential of the third power end and an output potential of the fourth power end are a same output potential, and a control terminal of the first photoelectric sensing element and a control terminal of the second photoelectric sensing element are under control of the same output potential such that the first photoelectric sensing element and the second photoelectric sensing element stay in off state.

For example, in the photoelectric detection circuit provided in the at least one embodiment of this disclosure, the first photoelectric sensing element comprises a first thin film transistor, and the second photoelectric sensing element comprises a second thin film transistor.

For example, in the photoelectric detection circuit provided in the at least one embodiment of this disclosure, the first thin film transistor comprises a first active layer, the second thin film transistor comprises a second active layer, and the first active layer and the second active layer are formed of a same semiconductor material.

For example, in the photoelectric detection circuit provided in the at least one embodiment of this disclosure, the semiconductor material comprises one or more selected from the group consisting of amorphous silicon, polysilicon or metallic oxide.

For example, in the photoelectric detection circuit provided in the at least one embodiment of this disclosure, the first active layer and the second active layer are formed of a same semiconductor layer.

At least one embodiment of this disclosure provides a photoelectric detection device comprising the photoelectric detection circuit mentioned above.

For example, in the photoelectric detection device provided in the at least one embodiment of this disclosure, further comprising a processing circuitry, wherein the processing circuitry is configured to detect variation of electrical signals output by the signal output lead and perform subsequent processing on the electrical signals.

For example, in the photoelectric detection device provided in the at least one embodiment of this disclosure, further comprising a base substrate, wherein the first detection sub-circuit and the second detection sub-circuit are disposed in a same layer with respect to the base substrate.

For example, in the photoelectric detection device provided in the at least one embodiment of this disclosure, further comprising a light blocking element, wherein the light blocking element overlaps the second detection sub-circuit to block light incident onto the photoelectric detection device from illuminating the second detection sub-circuit, and the first detection sub-circuit is exposed to allow light to be incident onto the photoelectric detection device to illuminate the first detection sub-circuit.

For example, in the photoelectric detection device provided in the at least one embodiment of this disclosure, further comprising a base substrate, wherein the first detection sub-circuit and the second detection sub-circuit are stacked up with respect to the base substrate, and the first detection sub-circuit is disposed on the second detection sub-circuit thereby light incident on the photoelectric detection device is blocked and is not capable of illuminating the second detection sub-circuit.

For example, in the photoelectric detection device provided in the at least one embodiment of this disclosure, further comprising a light blocking element, wherein the light blocking element is disposed between the first detection sub-circuit and the second detection sub-circuit and overlaps the second detection sub-circuit to block light incident onto the photoelectric detection device from illuminating the second detection sub-circuit.

At least one embodiment of this disclosure provides an electronic device comprising the photoelectric detection device mentioned above.

For example, in the electronic device provided in the at least one embodiment of this disclosure, the electronic device is a display panel comprising a display area, wherein the photoelectric detection device is disposed outside of or in the display area.

It is to be understood that the the above summary and the following detailed description of the present disclosure are both illustrative and exemplary and for further explaining the claimed invention.

BRIEF DESCRIPTION OF DRAWINGS

In order to explain the technical solutions of the present disclosure more clearly, accompanying drawings of embodiments will be described in brief below. It is obvious that the below described drawings only relate to some embodiments of the present disclosure rather than limiting the present disclosure.

DETAILED DESCRIPTION

Figure 1A:
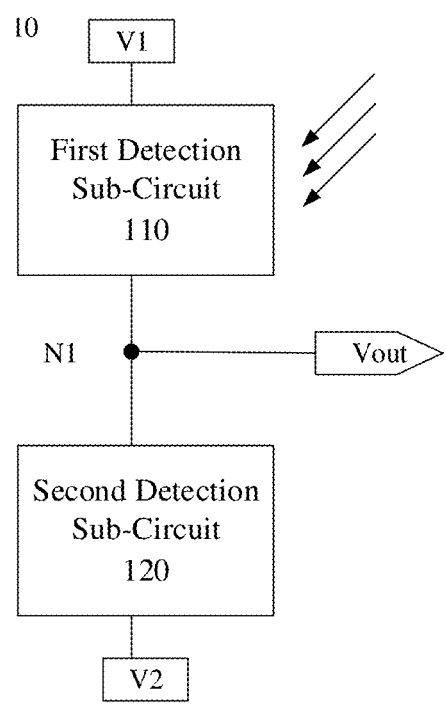
FIG. 1A is a structure diagram of a photoelectric detection circuit according to an embodiment of the present disclosure.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to keep the following description of embodiments of the present disclosure clear and concise, the present disclosure omits detail description of known functions and known components.

In view of power consumption and viewing comfort, many intelligent terminals are equipped with ambient light sensors to improve users' comfort and reduce power consumption by detecting illumination intensity of ambient light and thereby adjusting luminance of intelligent terminals according to the ambient light intensity. An ambient light sensor integrated on a display typically includes a photoelectric sensor such as a photodiode, e.g. PN-junction photodiode, PIN junction photodiode, avalanche photodiode and Schottky photodiode and a transistor such as thin film transistor (TFT). For example, an end electrode of the photodiode is coupled to the drain or source of the thin film transistor. The photoelectric sensor converts visible light into electrical signals. Then under the action of driving circuit, the thin film transistor is turned on so that the electrical signals converted by the photoelectric sensor may be transmitted to the data processing circuit via the thin film transistor, and the data processing circuit may amplify, analog/digital convert the electrical signals further. However, manufacturing the photoelectric sensor and the thin film transistor separately increases manufacturing processes and manufacturing costs and the photoelectric sensor and thin film transistor will vary in characteristics with environment variation such as temperature, thereby influencing the detection results.

Therefore, the present invention provides a novel ambient light sensor based on TFT technology that reduces the number of processes and costs by using TFT manufacturing processes and may mitigate influence on detection results by characteristic variation of TFT with environment variation such as temperature.

At least one embodiment of the present disclosure provides a photoelectric detection circuit including a first detection sub-circuit configured to be exposed to the environment of light to be detected, an equivalent resistance of the first detection sub-circuit varies with the variation of illumination intensity of the light to be detected; a second detection sub-circuit configured to be in a state of fixed illumination intensity and having an equivalent resistance that is constant due to the fixed illumination intensity; and a signal output lead. The first detection sub-circuit is connected in series with the second detection sub-circuit via a first node and the signal output lead is electrically connected with the first node to output detected electrical signals.

At least one embodiment of the present disclosure further provides a photoelectric detection device including the above-described photoelectric detection circuit.

At least one embodiment of the present disclosure further provides an electronic device including the above-described photoelectric detection device.

As compared to traditional ambient light sensors, the above-described photoelectric detection circuit, photoelectric detection device or electronic device provided in at least one embodiment of the present disclosure effectively reduce manufacturing processes and manufacturing costs and mitigate the adverse influence on detection results by TFT's characteristic variation with the variation of environment factors such as temperature.

Non-limiting description of embodiments of the present disclosure and examples thereof will be presented below with reference to figures.

At least one embodiment of the present disclosure provides a photoelectric detection circuit that is for example applicable in any electronic devices with display function such as smartphones, tablet computers and liquid crystal TVs. For example, the photoelectric detection circuit may enable integration of ambient light sensors in TFT liquid crystal displays (LCDs) and organic light emitting diode (OLED) displays for replacing add-on ambient light sensors, which may utilize existing TFT processes and thereby reducing manufacturing processes and manufacturing costs.

Figure 1B:
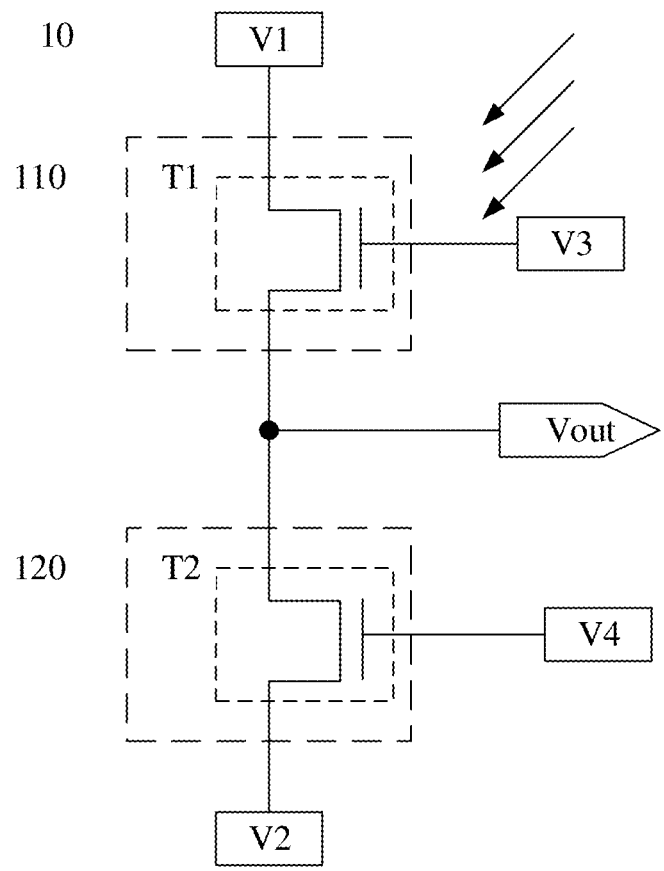
FIG. 1B is a structure diagram of another photoelectric detection circuit according to an embodiment of the present disclosure.

FIG. 1A is a structure diagram of a photoelectric detection circuit 10 according to an embodiment of the present disclosure, and FIG. 1B is a structure diagram of another photoelectric detection circuit 10 according to an embodiment of the present disclosure. For example, as shown in FIG. 1, the photoelectric detection circuit 10 includes a first detection sub-circuit 110, a second detection sub-circuit 120 and a signal output lead Vout. The first detection sub-circuit 110 is configured to be exposed to the environment of light to be detected and has an equivalent resistance that varies with the variation of illumination intensity of the light to be detected in the environment. The second detection sub-circuit 120 is configured to be a state of fixed illumination intensity and has an equivalent resistance that is constant due to the fixed illumination intensity. The first detection sub-circuit 110 is connected in series with the second detection sub-circuit 120 via a first node N1 and the signal output lead Vout is electrically connected with the first node N1 to output detected electrical signals.

It is to be noted that the second detection sub-circuit 120 is configured to be in a state of fixed illumination intensity that includes a state without illumination, namely a shaded state. Since the seriesly connected first detection sub-circuit 110 and second detection sub-circuit 120 are adjacent to each other, it may be considered that environment factors other than illumination intensity such as temperature and humidity are the same.

When ambient light illuminates the above-described photoelectric detection circuit 10, since the first detection sub-circuit 110 is exposed to the environment of light to be detected and has an equivalent resistance that varies with the variation of illumination intensity of ambient light, while the second detection sub-circuit has an equivalent resistance that does not vary without influence of the illumination intensity variation of ambient light, it is possible to detect the variation of illumination intensity of ambient light by detecting the partial voltage of the circuit composed by the series connection of the first detection sub-circuit and the second detection sub-circuit, namely detecting the variation of voltage Vout of electrical signals output by the output lead electrically connected to the first node N1 to detect the variation of illumination intensity of ambient light.

For example, in some embodiments, as shown in FIG. 1A, one end of the first detection sub-circuit 110 is electrically connected to the first power end V1, one end of the second detection sub-circuit 120 is electrically connected to the second power end V2 with an output potential lower than that of the first power end, so that it is possible to detect variation of illumination intensity of ambient light by detecting partial voltage in the circuit composed by series connection of the first detection sub-circuit 110 and the second detection sub-circuit 120.

It is to be noted that in embodiments of the present disclosure, the symbol Vdata can not only represent the signal output lead, but also can represent the voltage of electrical signals output by the signal output lead. In addition, it is to be noted that in the description of embodiments of the present disclosure, the first node N1 does not necessarily represent a component that exist actually but represent a joining point of related circuit connections in a circuit diagram. The same applies to the following embodiments and will not be described any more.

For example, as shown in FIG. 1B, the first detection sub-circuit 110 includes a first photoelectric sensing element 111 and the second detection sub-circuit 120 includes a second photoelectric sensing element 121. The first photoelectric sensing element 111 and the second photoelectric sensing element 121 have the same electrical characteristics.

It is to be noted that in the following description of the present disclosure, "have the same electrical characteristics" means that electric elements of the same type have the same or substantially the same electrical characteristics while being applied with the same voltage. For example, when two electric elements of the same type have the same material, size, manufacturing conditions, in case the same power supply voltage and control signals are applied, the two electric elements of the same type have substantially the same electrical characteristics such as off currents. However, it is not required that the two elements must be strictly the same and difference in a certain range is allowed, such as a difference 10% less than either of the two or 5% less as another example.

It is to be noted that, for example, the second photoelectric sensing element 121 and the first photoelectric sensing element 111 may have substantially the same structure and electrical characteristics except that the second photoelectric sensing element 121 is shaded to reduce or prevent light from illuminating the second photoelectric sensing element 121. Therefore, in embodiments of the present disclosure, the relevant description of the structure and electrical characteristics of the first photoelectric sensing element 111 is also applicable to the second photoelectric sensing element 121 in case that no conflicts exist and repetitions will not be described any more.

In this manner, it is possible to reduce influence of environment factors such as temperature on the detection results when detecting light intensity variation by measuring partial voltage while two photoelectric sensing elements with the same electrical characteristics are connected in series. This is because environment factors are substantially the same for the two photoelectric sensing elements with the same electrical characteristics except for the illumination intensity.

For example, in order for the second detection sub-circuit 120 to be in a state of fixed illumination intensity, in an embodiment of the prevent disclosure, a light blocking element may be used to block the ambient light to be detected from illuminating the second detection sub-circuit. The light blocking element may be completely opaque or substantially opaque.

It is to be noted that in order for the second detection sub-circuit 120 to be in a state of fixed illumination intensity, for example, it is possible to cover the second detection sub-circuit with black tape as the light blocking element, or with dark glue, a metal layer as the light blocking element, or with light filters of different types with response wavelength ranges as the light blocking element. Implementations of the light blocking elements for blocking light are not limited in embodiments of the present disclosure.

For example, as shown in FIG. 1B, the first photoelectric sensing element 111 may include a first thin film transistor T1 and the second photoelectric sensing element 121 may also include a second thin film transistor T2. For example, the thin film transistor may include an oxide thin film transistor, an amorphous silicon thin film transistor or a polysilicon thin film transistor. For example, the basic component of a thin film transistor is the active layer, namely semiconductor layer, which typically consists of one or more semiconductor materials such as amorphous silicon (A-Si), polysilicon or metallic oxides. These semiconductor materials generally have good photosensitivity. For example, the polysilicon may be high temperature polysilicon (with crystallization temperature above 600 degree centigrade) or low temperature polysilicon (with crystallization temperature below 600 degree centigrade).

For example, in order for the first photoelectric sensing element 111 and the second photoelectric sensing element 121 to have the same electrical characteristics, the first thin film transistor T1 included in the first photoelectric sensing element 111 and the second thin film transistor T2 included in the second photoelectric sensing element 121 may be formed of the same semiconductor material, alternatively, the first thin film transistor T1 and the second thin film transistor T2 are disposed adjacent to each other and use different parts of the same semiconductor layer, thereby reducing difference of the semiconductor layer in the manufacturing process such as deposition and crystallization due to process variation.

For example, in an embodiment of the present disclosure, the first thin film transistor T1 and the second thin film transistor T2 may be manufactured by low temperature polysilicon process for high mobility and small volume of the thin film transistor.

For example, in an embodiment of the present disclosure, both the first thin film transistor T1 and the second thin film transistor T2 may be bottom gate thin film transistors or top gate thin film transistors.

For example, in an embodiment of the present disclosure, both the first thin film transistor T1 and the second thin film transistor T2 may be N-type transistors or P-type transistors.

For example, in an embodiment of the present disclosure, control terminals of the first thin film transistor T1 and the second thin film transistor T2 are electrically connected to the third power end V3 and the fourth power end V4 respectively. And in order for the first thin film transistor T1 and the second thin film transistor T2 to have the same electrical characteristics, voltages applied to the control terminals of the first thin film transistor T1 and the second thin film transistor T2 are the same, that is, the output potential of the third power end V3 and the output potential of the fourth power end V4 are the same.

Figure 2:
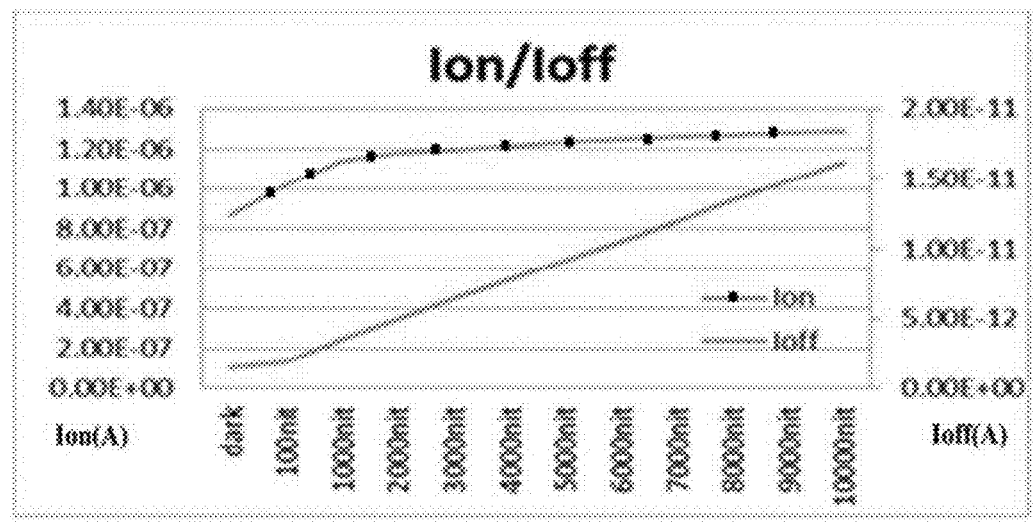
FIG. 2 is a graph of characteristics of a thin film transistor (TFT) according to an embodiment of the present disclosure under different illumination conditions.

For example, FIG. 2 shows a plot of on current (Ion) and off current (Ioff) of a low temperature amorphous silicon thin film transistor under the same source-drain voltage (e.g. 12V) and different illumination conditions. In FIG. 2, the abscissa is illumination intensity, the ordinate is current values for on current and off current respectively, wherein the on current (Ion) of a thin film transistor refers to the current between source and drain while the thin film transistor is turned on (on state), and the off current (Ioff) of a thin film transistor refers to the current between source and drain while the thin film transistor is off (off state). As can be seen in FIG. 2, in case that the illumination intensity increases from 0 to 10000 nit, the off current (Ioff) of the amorphous silicon thin film transistor increases by 2-3 orders of magnitude, which is more obvious than variation of on current (Ion) with the variation of illumination intensity, and its equivalent resistance varies accordingly at the same time. Therefore, in order to better detect variation of illumination intensity of the light to be detected in the environment, for example, it is possible to place the thin film transistor in off state during the ambient light detection process.

For example, the first photoelectric sensing element 111 and the second photoelectric sensing element 121 have the same electrical characteristics, the first thin film transistor T1 included in the first photoelectric sensing element 111 and the second thin film transistor T2 included in the second photoelectric sensing element 121 have the same electrical characteristics. For example, the first thin film transistor T1 and the second thin film transistor T2 may be formed of the same material and with substantially the same manufacturing conditions; and at the same time, constituent parts of them such as active layers, gates and sources/drains have the same sizes. Thus, under the same voltage, the first thin film transistor T1 and the second thin film transistor T2 have the same characteristics. It is to be noted that there may be a certain difference between the first thin film transistor T1 and the second thin film transistor T2. It is only required to ensure that under the same voltage, the first thin film transistor T1 and the second thin film transistor T2 have the same electrical characteristics. For example, under the same gate voltage, and under the same environmental conditions such as the same illumination intensity, the off current generated by the first thin film transistor T1 and the off current generated by the second thin film transistor T2 is identical, that is, the equivalent resistances are identical.

Figure 3:
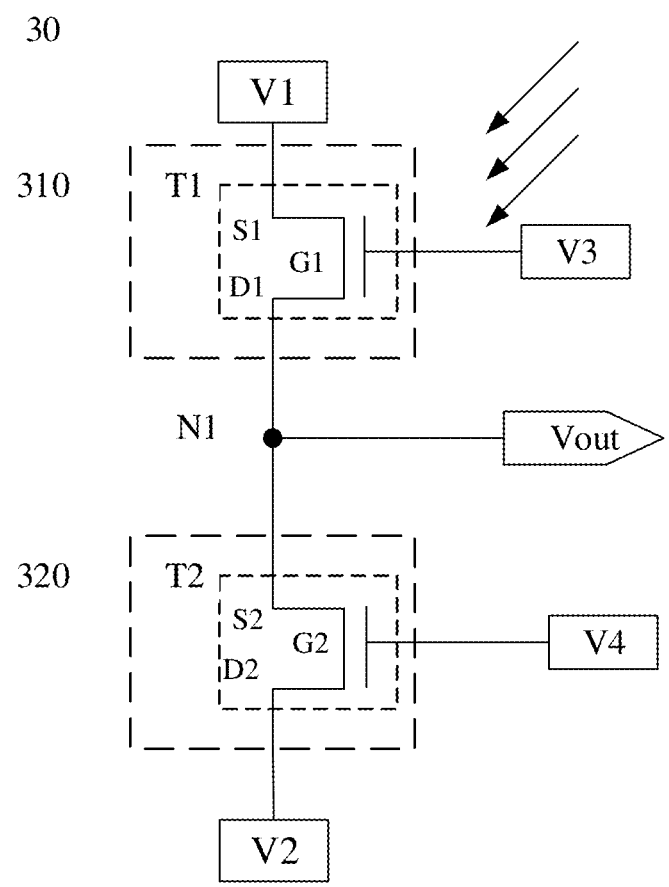
FIG. 3 is a structure diagram of a photoelectric detection circuit according to an example embodiment of the present disclosure.

FIG. 3 is a structure diagram of a photoelectric detection circuit 30 according to an example embodiment of the present disclosure. As shown in FIG. 3, the photoelectric detection circuit 30 includes a first detection sub-circuit 310 and a second detection sub-circuit 320. The first detection sub-circuit 310 includes a first photoelectric sensing element 311 including a first thin film transistor T1 and the second detection sub-circuit 320 includes a second photoelectric sensing element 321 including a second thin film transistor T2. And the first thin film transistor T1 and the second thin film transistor T2 have the same electrical characteristics.

For example, as shown in FIG. 3, in some embodiments, the photoelectric detection circuit 30 further includes a first power end V1 and a second power end V2. The first end of the first photoelectric sensing element 311 is electrically connected to the first power end V1, the second end of the second photoelectric sensing element 321 is electrically connected to the second power end V2, and both the second end of the first photoelectric sensing element 311 and the first end of the second photoelectric sensing element 321 are electrically connected to the first node N1.

For example, in some embodiments, the first photoelectric sensing element 311 includes a first thin film transistor T1 and the second photoelectric sensing element 321 includes a second thin film transistor T2. In such embodiments, as shown in FIG. 3, the source S1 of the first thin film transistor T1 is connected to the first power end V1, the drain D2 of the second thin film transistor T2 is electrically connected to the second power end V2, and both the drain D1 of the first thin film transistor T1 and the source S2 of the second thin film transistor T2 are electrically connected to the first node N1, such that the first thin film transistor T1 and the second thin film transistor T2 provide a path from the first power end V1 to the second power end V2.

It will be understood that in the embodiment shown in FIG. 3, both the first thin film transistor T1 and the second thin film transistor T2 are P-type transistors. However, embodiments of the present invention are not limited thereto. It is to be noted that sources and drains of the first thin film transistor T1 and the second thin film transistor T2 may be exchanged according to the applied power supply voltages, which is not limited in embodiments of the present disclosure.

For example, in some embodiments, the output potential of the first power end V1 is higher than that of the second power end V2. As another example, in the photoelectric detection circuit provided in at least one embodiment of the present disclosure, the first power end V1 and the second power end V2 have output potentials with the opposite polarities and the same magnitude. For example, in some embodiments, the first power end V1 is of 12V, and the second power end V2 is of –12V. Furthermore, in some embodiments of the present disclosure, the photoelectric detection circuit 30 further includes the third power end V3 and the fourth power end V4. As shown in FIG. 3, the control terminal (namely the gate G1) of the first photoelectric sensing element 311 is electrically connected to the third power end V3; and the control terminal (namely the gate G2) of the second photoelectric sensing element 321 is electrically connected to the fourth power end V4.

For example, in the photoelectric detection circuit provided in at least one embodiment of the present disclosure, the third power end V3 and the fourth power end V4 have the same output potentials. For example, during operation process, the control terminal (namely the gate G1) of the first photoelectric sensing element 311 and the control terminal (namely the gate G2) of the second photoelectric sensing element 321 allow the first photoelectric sensing element 311 and the second photoelectric sensing element 321 to stay in the off state under the control of the same output potential.

For example, in some embodiments, the first photoelectric sensing element 311 includes a first thin film transistor T1 and the second photoelectric sensing element 321 includes a second thin film transistor T2. In such embodiments, the gate electrode G1 of the first thin film transistor T1 is electrically connected to the third power end V3, and the gate G2 of the second thin film transistor T2 is electrically connected to the fourth power end V4, as shown in FIG. 3.

For example, in some embodiments, the third power end V3 may be of –12V and the fourth power end V4 is also of –12V.

It is to be noted that the specific magnitudes of potentials of the third and fourth power ends are not limited in embodiments of the present disclosure as long as it is ensured that in the whole ambient light detection process, both the first photoelectric sensing element 311 (e.g. the first thin film transistor T1) and the second photoelectric sensing element 321 (e.g. The second thin film transistor T2) stay in off state. For example, the specific magnitudes of potentials of the third and fourth power ends are those values that allow the first photoelectric sensing element 311 (e.g. the first thin film transistor T1) to stay in off state under the strongest illumination intensity as the second photoelectric sensing element 321 (e.g. The second thin film transistor T2) under no illumination.

For example, as shown in FIG. 3, a photoelectric detection circuit 30 provided in at least one embodiment of the present disclosure includes a first thin film transistor T1 and a second thin film transistor T2 connected in series and having the same electrical characteristics. The gate G1 of the first thin film transistor T1 is electrically connected to the third power end V3=–12V, the source S1 of the first thin film transistor T1 is connected to the first power end V1=12V, the drain D2 of the second thin film transistor T2 is electrically connected to the second power end V2=–12V, the gate G2 of the second thin film transistor T2 is electrically connected to the fourth power end V4=–12V, and both the drain D1 of the first thin film transistor T1 and the source S2 of the second thin film transistor T2 are electrically connected to the first node N1, and the signal output lead Vout is electrically connected with the first node N1 to output electrical signals. The first thin film transistor T1 is exposed to the environment of light to be detected, while the second thin film transistor T2 is blocked such that ambient light can not illuminate the second thin film transistor T2. For example, the second thin film transistor T2 is under the no-illumination (DARK) condition.

For example, in such embodiments, assuming that equivalent resistances of T1 and T2 are R(T1) and R(T2) respectively, since T1 and T2 have the same electrical characteristics, T1 and T2 also have the same off current Ioff under the same voltage and the same illumination intensity. Therefore it is possible to consider that equivalent resistances of T1 and T2 in off state R(T1)=R(T2)=Roff.

Hereinbelow, assuming that thin film transistors T1 and T2 in the photoelectric detection circuit 30 shown in FIG. 3 have the same electrical characteristics (with specific electrical characteristics described in detail below), it is possible to obtain the correspondence between the voltage Vout of electrical signals output by the output lead electrically connected to the first node N1 in the photoelectric detection circuit 30 and the illumination intensity, as shown in Table 1 more specific values may be obtained which may be understood with reference to Table 1.

Therefore, referring to the above Table 1, it is possible to derive the magnitude of illumination intensity inversely (e.g. looking up table directly or further interpolation) according to the measured value of Vout. It is to be noted that it is allowed that there is an error in a certain range between the measurement values and calculated values of the voltage Vout due to factors such as manufacturing process and practical operations, and it is generally required to process

TABLE 1

|  | Dark | 1000 nit | 2000 nit | 3000 nit | 4000 nit | 5000 nit | 6000 nit | 7000 nit | 8000 nit | 9000 nit | 10000 nit |
| --- | --- | --- | --- | --- | --- | --- | --- | --- | --- | --- | --- |
| Vout (V) | 0.00 | 3.27 | 5.49 | 6.95 | 7.68 | 8.27 | 8.71 | 9.04 | 9.35 | 9.57 | 9.75 |

Because for the above-described thin film transistors T1 and T2, semiconductor materials for the active layers will generate photo-induced carriers under illumination, thereby forming current, which will influence the off characteristics of the TFT. Therefore, it is possible to simulate the characteristics variation relationship of thin film transistor T1 or T2 under illumination separately to measure the variation of off current Ioff of T1 with the same electrical characteristics as T2 in off state with the variation of illumination intensity, and calculate the value of equivalent resistance Roff of T1 under respective conditions as shown in Table 2.

such as correct the error, which is not limited in embodiments of the present invention.

As can be known, the photoelectric detection circuit 30 in the above-described embodiments of the present disclosure can detect variation of illumination intensity by measuring partial voltage variation. The photoelectric detection circuit 30 implements ambient light detection function with only two same thin film transistors, can utilize current TFT manufacturing process, replaces traditional add-on ambient light sensors, and reduces manufacturing processes and manufacturing costs since it's compatible with manufactur-

TABLE 2

|  | Dark | 1000 nit | 2000 nit | 3000 nit | 4000 nit | 5000 nit | 6000 nit | 7000 nit | 8000 nit | 9000 nit | 10000 nit |
| --- | --- | --- | --- | --- | --- | --- | --- | --- | --- | --- | --- |
| Ioff (A) | 8.00E−13 | 1.40E−12 | 2.15E−12 | 3.00E−12 | 3.65E−12 | 4.35E−12 | 5.05E−12 | 5.70E−12 | 6.45E−12 | 7.10E−12 | 7.75E−12 |
| Roff (Ω) | 1.50E+13 | 8.57E+12 | 5.58E+12 | 4.00E+12 | 3.29E+12 | 2.76E+12 | 2.38E+12 | 2.11E+12 | 1.86E+12 | 1.69E+12 | 1.55E+12 |

Hereinbelow, according to data in Table 2, it is possible to calculate the expected value of voltage Vout of electrical signals output by the output lead electrically connected to the first node N1 in the photoelectric detection circuit 30 with the following equation.

$$V\text{out}=(V1-V2)/(R(T1)+R(T2))\times R(T2)-12$$

For example, in case both the first thin film transistor T1 and the second thin film transistor T2 are in dark, the first thin film transistor T1 and the second thin film transistor T2 have the same equivalent resistance, namely R(T1)=R(T2)=1.50E+13Ω. Now, the voltage Vout may be calculated with the above-described equation as Vout=0V.

As another example, under an illumination intensity of 5000 nit, the equivalent resistance of the first thin film transistor T1 exposed to illumination environment varies with the variation of illumination intensity. As can be known from Table 2, R(T1)=2.76E+12Ω. While the second thin film transistor T2 is still in dark environment, its equivalent resistance does not change, namely R(T2)=1.50E+13Ω. Now, it is possible to use the above equation to obtain Vout=8.27V.

As another example, under an illumination intensity of 10000 nit, the equivalent resistance of the first thin film transistor T1 exposed to illumination environment is R(T1)=1.55E+12Ω. While the second thin film transistor T2 is still in dark environment, its equivalent resistance does not change, namely R(T2)=1.50E+13Ω. Now, it is possible to use the above equation to obtain Vout=9.75V. Similarly, ing processes for LCD, OLED display devices. Furthermore, using two same TFTs connected in series can mitigate influence of variation of TFT's characteristics with variation of environment such as temperature on the detection results.

Figure 4:
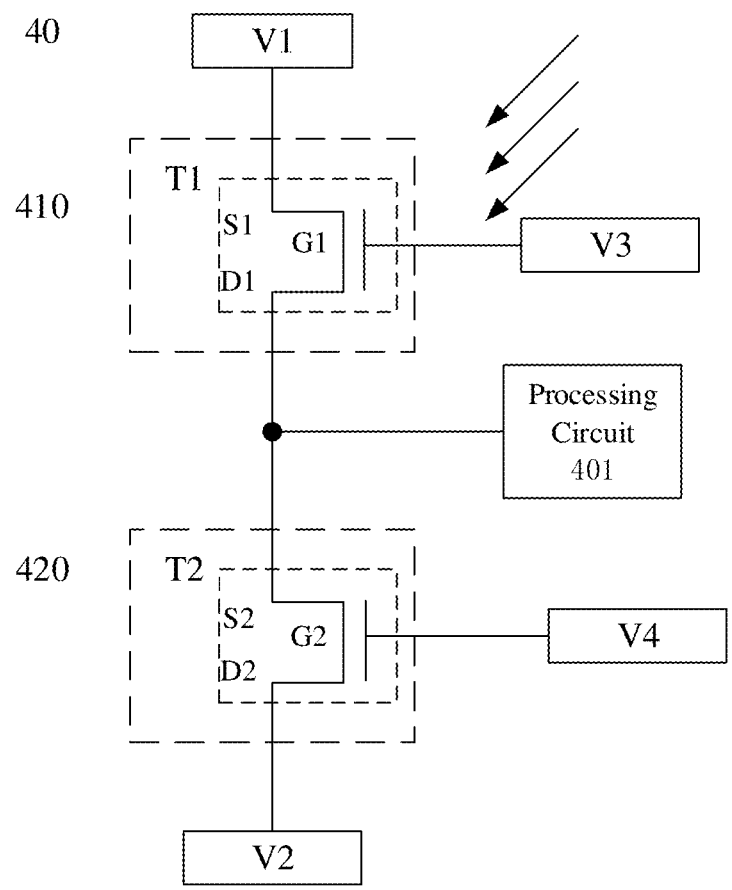
FIG. 4 is a structure diagram of a photoelectric detection device according to an embodiment of the present disclosure.
Figure 5A:
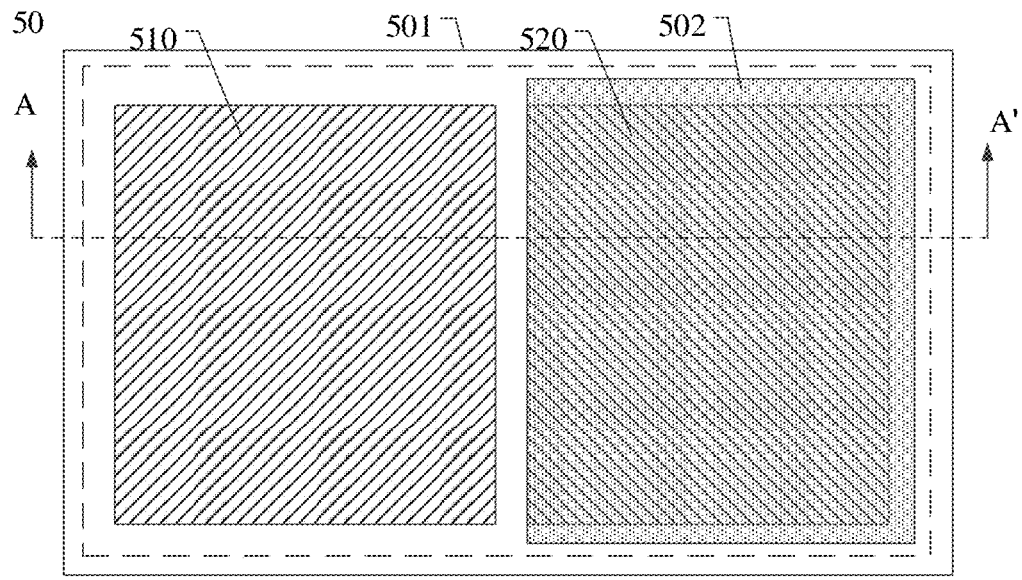
FIG. 5A is a plan view of a photoelectric detection device according to an embodiment of the present disclosure.
Figure 5B:
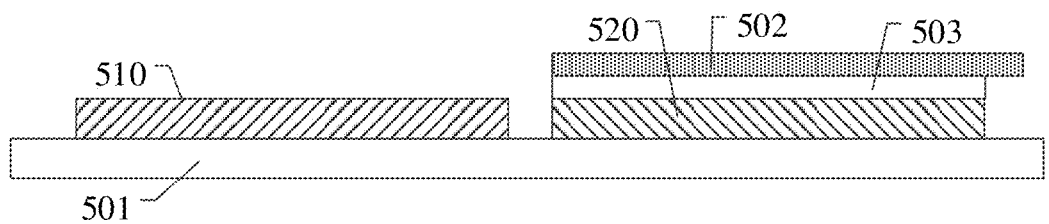
FIG. 5B is a sectional structure diagram of the photoelectric detection device along the direction of line A-A' in FIG. 5A.
Figure 5C:
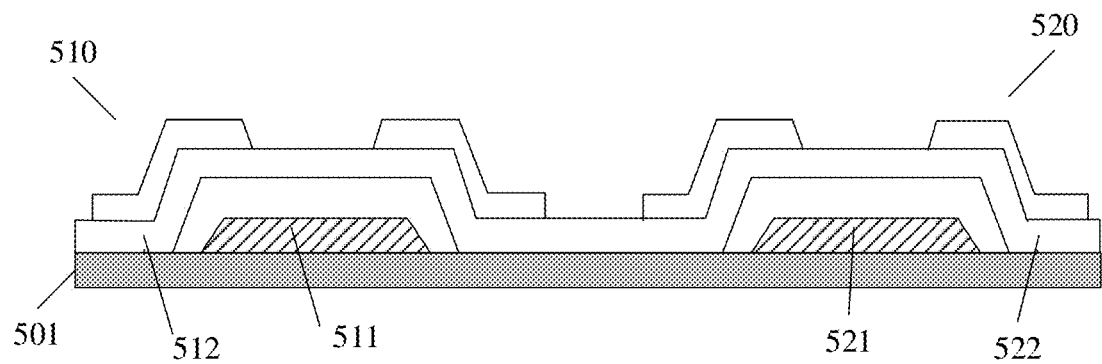
FIG. 5C is a structure diagram of a first and second detection sub-circuits disposed in a same layer according to an embodiment of the present disclosure.

At least one embodiment of the present disclosure further provides a photoelectric detection device including the above-described photoelectric detection circuit. FIG. 4 is a structure diagram of a photoelectric detection device according to an embodiment of the present disclosure; FIG. 5A is a plan view of a photoelectric detection device according to an embodiment of the present disclosure; FIG. 5B is a sectional structure diagram of the photoelectric detection device along the direction of line A-A' in FIG. 5A; and FIG. 5C is a structure diagram of a first and second detection sub-circuits disposed in a same layer according to an embodiment of the present disclosure.

For example, as shown in FIG. 4, in some embodiments, the photoelectric detection device 40 includes the photoelectric detection circuits described in any one of the above-described embodiments, such as the photoelectric detection circuit same as that shown in FIG. 3. The photoelectric detection circuit includes a first detection sub-circuit 410 and a second detection sub-circuit 420, the first detection sub-circuit 410 includes a first photoelectric sensing element 411 and the second detection sub-circuit 420 includes a second photoelectric sensing element 421.

For example, in some embodiments, the photoelectric detection device 40 further includes a processing circuitry 401 configured to detect variation of electrical signals output by the signal output lead Vout and perform subsequent processing on the electrical signals, such as providing the resultant data signals to the central processor (CPU). For example, the processing circuitry 401 may include an amplifying circuit for amplifying signals, and may also include a conversion circuit for digital to analog conversion, which is not limited in embodiments of the present disclosure.

For example, the photoelectric detection device 50 provided in at least one embodiment of the present disclosure further includes a base substrate 501. For example, in some embodiments, the first detection sub-circuit 510 and the second detection sub-circuit 520 are disposed in the same layer with respect to the base substrate 500, as shown in FIGS. 5A-5C. Thus, the first detection sub-circuit and the second detection sub-circuit may be formed simultaneously with the same process. Therefore, the photoelectric detection circuit provided in the present embodiment may simplify manufacturing process and improve yield of the photoelectric detection devices. In addition, although FIGS. 5A-5C do not show the signal output lead, the signal output lead may be formed in the same layer as a certain conductive member such as gate or source or drain in the first detection sub-circuit 510 and the second detection sub-circuit 520.

For example, as shown in FIG. 5C, in some embodiments, the first thin film transistor included in the first detection sub-circuit 510 and the second thin film transistor included in the second detection sub-circuit 520 are disposed adjacent to each other and utilize different parts of the same semiconductor layer. For example, as shown in FIG. 5C, the active layer 512 of the first thin film transistor and the active layer 522 of the second thin film transistor are the same semiconductor layer. In this manner, it is not only possible to form the two TFTs at the same time with the same process, but also possible to allow the two TFTs to have the same electrical characteristics. For example, in the example shown in FIG. 5C, both the first and second thin film transistors are bottom gate thin film transistors. The gate 511 of the first thin film transistor and the gate 521 of the second thin film transistor are disposed adjacent to each other and below the active layer.

Most existing liquid crystal displays adopt the bottom gate structure. Because in the bottom gate structure, the opaque gate electrode metal layer can block light from the backlight well to prevent light from illuminating the active layer to generate carriers and hence influencing the off current characteristics of the thin film transistor. However, the specific type of the thin film transistor is not limited in embodiments of the present disclosure.

For example, in some embodiments, the photoelectric detection device 50 further includes a light blocking element 502. The light blocking element 502 overlaps the second detection sub-circuit 520 to block light incident onto the photoelectric detection device 50 from illuminating the second detection sub-circuit 520 and expose the first detection sub-circuit 510 to allow light to be incident onto the photoelectric detection device 50 to illuminate the first detection sub-circuit 510, as shown in FIG. 5B.

For example, the material for the light blocking element 502 may be opaque material. The opaque material may be metal material that may include for example, molybdenum (Mo), copper (Cu), aluminum (Al) or zinc (Zn). The opaque material may also be non-metallic material including for example, acrylic resin incorporating black pigments such as carbon.

For example, the photoelectric detection device 50 further includes a first insulating layer 503 disposed between the light blocking element 502 and the second detection sub-circuit 520, as shown in FIG. 5B. The first insulating layer 503 is configured to prevent the light blocking element 502 from shorting with electronic components in the second detection sub-circuit 520 and to protect the second detection sub-circuit 520.

Figure 6A:
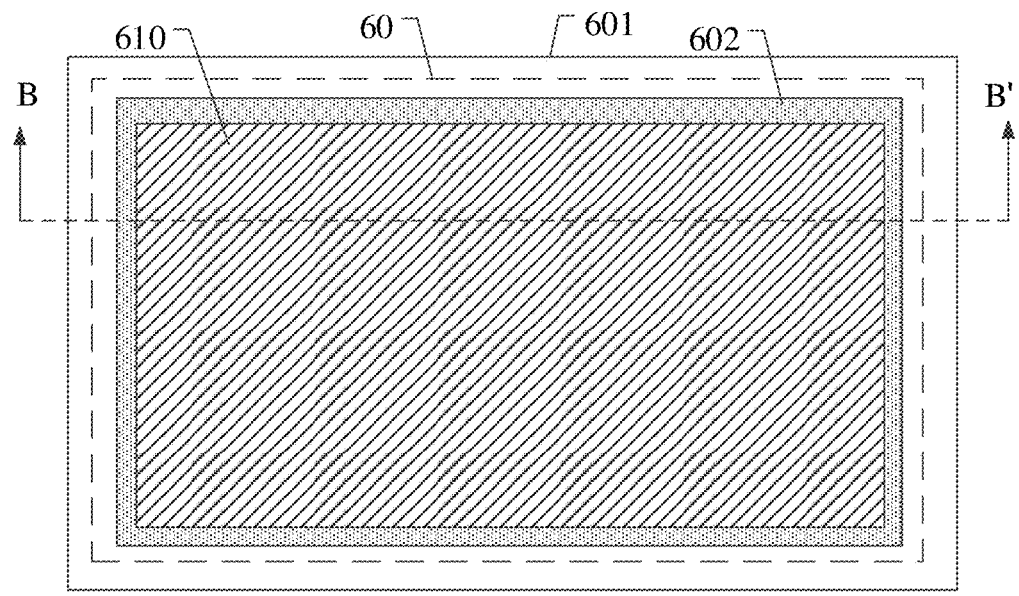
FIG. 6A is a plan view of another photoelectric detection device according to an embodiment of the present disclosure.
Figure 6B:
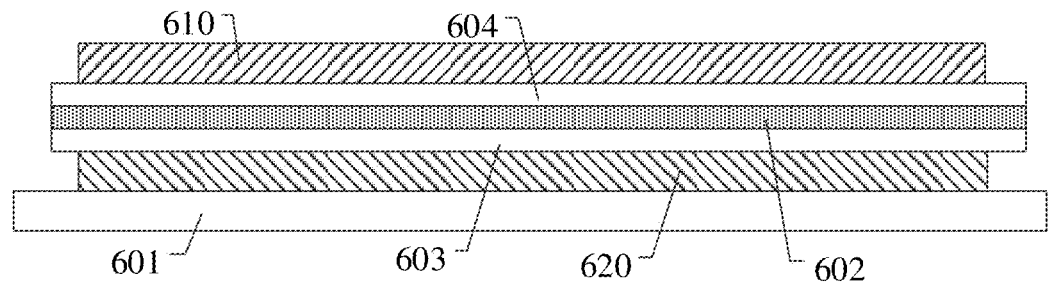
FIG. 6B is a sectional structure diagram of the photoelectric detection device along the direction of line B-B' in FIG. 6A.

FIG. 6A is a plan view of another photoelectric detection device according to an embodiment of the present disclosure; and FIG. 6B is a sectional structure diagram of the photoelectric detection device along the direction of line B-B' in FIG. 6A.

For example, in some embodiments, the first detection sub-circuit 610 and the second detection sub-circuit 620 are stacked up one another with respect to the base substrate 601, as shown in FIGS. 6A-6B. And the first detection sub-circuit 610 is disposed on the second detection sub-circuit 620 to block light incident onto the photoelectric detection device 60 from illuminating the second detection sub-circuit 620, as shown in FIG. 6A.

For example, the photoelectric detection device 60 provided in at least one embodiment of the present disclosure further includes a light blocking element 602, as shown in FIG. 6B. The light blocking element 602 is disposed between the first detection sub-circuit 610 and the second detection sub-circuit 620 and overlaps the second detection sub-circuit 620 to block light incident onto the photoelectric detection device 60 from illuminating the second detection sub-circuit 620.

For example, the light blocking element 602 may be a reflective layer. The first photoelectric sensing element converts partial incident light into electrical signals. If the incident light is not converted into electrical signals completely, the non-converted part of incident light may be blocked and reflected by the light blocking element 602 and hits the first photoelectric sensing element again such that the first photoelectric sensing element can convert incident light signals totally, thereby improving detection accuracy.

For example, the photoelectric detection circuit 60 may further include a second insulating layer 603 and a third insulating layer 604. The second insulating layer 603 is disposed between the light blocking element 602 and the second sub-circuit 620 to prevent the light blocking element 602 from shorting with electronic elements in the second sub-circuit 620; and the third insulating layer 604 is disposed between the light blocking element 602 and the first sub-circuit 610 to prevent the light blocking element 602 from shorting with electronic elements in the first sub-circuit 610.

For example, the photoelectric detection device may further include a passivation layer (not shown in the figures). The passivation layer is disposed on the photoelectric detection circuit to isolate the photoelectric detection circuit from outside, thereby reducing penetration of external water and oxygen into electronic elements of the photoelectric detection circuit, effectively improving performance of stability of electronic elements in the photoelectric detection circuit and prolonging service life of the photoelectric detection circuit.

For example, the materials for the first insulating layer 503, the second insulating layer 603 and the third insulating layer 604 may be silicon nitride (SiNx), silicon oxide (SiOx), silicon oxynitride (SiNxOy) or other suitable materials.

For example, the base substrates 501 and 601 may be glass substrates, quartz substrates, ceramic substrates, plastic substrates or silica gel substrates. As another example, the base substrate may be a panel formed with functional components thereon such as other circuits or elements.

Figure 7:
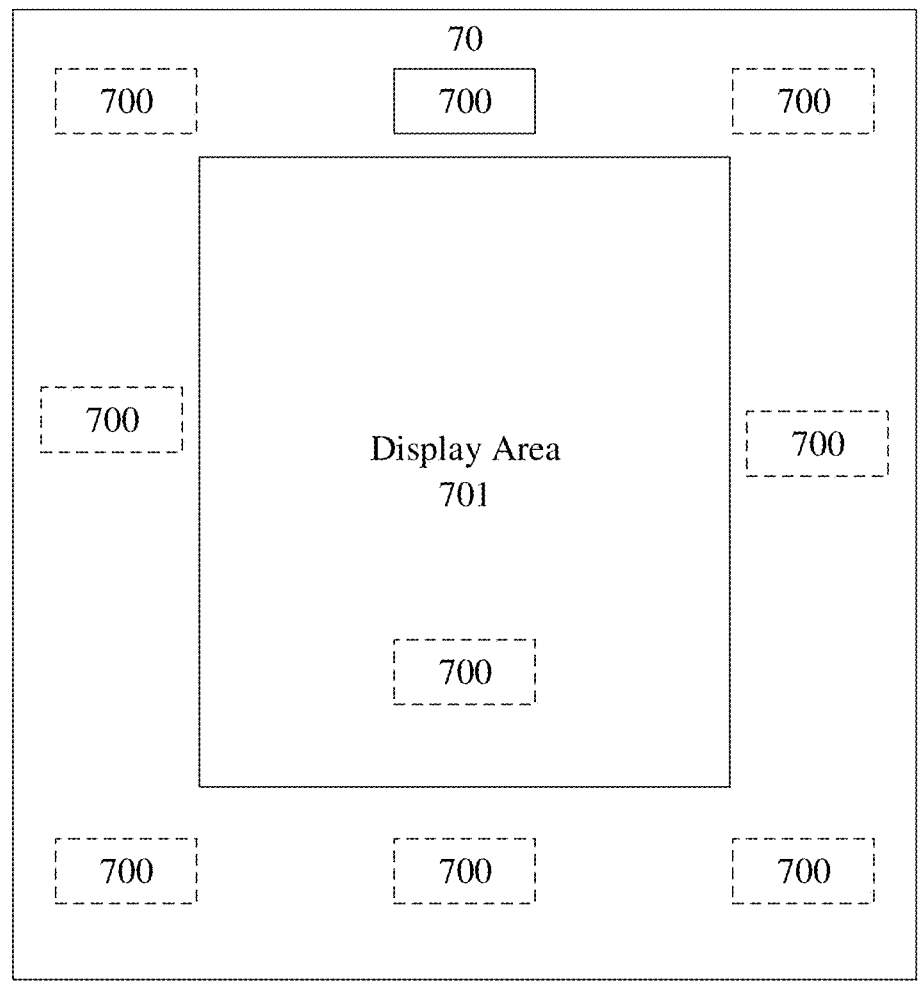
FIG. 7 is a plan view of an electronic device according to an embodiment of the present disclosure.

At least one embodiment of the present disclosure further provides an electronic device 700 including the above-described photoelectric detection device 70. FIG. 7 is a plan view of an electronic device 70 according to an embodiment of the present disclosure.

For example, in some embodiments, as shown in FIG. 7, the electronic device 70 may be (or include) a display panel that may be a liquid crystal panel, an organic light emitting diode (OLED) display panel (such as a soft OLED display panel) or a quantum dot light emitting diode (QLED) display panel. The display panel includes a display area 701 wherein the photoelectric detection device 700 is disposed outside of the display area. For example, the photoelectric detection device 700 may surround one, two, three or four sides of the display area, as shown in FIG. 7. Alternatively, in some other embodiments, the photoelectronic detection device 700 is disposed in the display area 701. For example, the first photoelectronic sensing elements are disposed between display subpixels to receive ambient light, while the second photoelectronic sensing elements are disposed under display subpixels to be blocked from light. Of course, embodiments of the present disclosure are not limited to this specific arrangement. For example, it may be specifically used to detect ambient light while the display area of the display panel is in off state. Thus, preventing light sources of the display panel from disturbing the photoelectric detection circuit improves the accuracy and reliability of ambient light detection, allows the display panel to adjust luminance of the display panel automatically according to the detected intensity of ambient light to achieve the effects of low energy consumption and high image quality, and improve users' comfort at the same time.

For the present disclosure, there are still the following aspects to be explained.

(1) Accompanying drawings of embodiments of the present disclosure relate only to structures involved in embodiments of the present disclosure. For other structures, common designs may be referred to.

(2) Without conflicts, embodiments of the present disclosure and features in embodiments may be combined with each other to obtain new embodiments.

What have been described above are only specific implementations of the present disclosure. However, the scope of the present disclosure is not limited thereto and should be subject to the scope of the claims.

The invention claimed is:

1. A photoelectric detection circuit, comprising:
a first detection sub-circuit configured to be exposed to an environment of light to be detected and having an equivalent resistance that varies with a variation of illumination intensity of the light to be detected;
a second detection sub-circuit configured to be in a state of fixed illumination intensity and having an equivalent resistance that is constant due to the fixed illumination intensity; and
a signal output lead,
wherein the first detection sub-circuit is connected in series with the second detection sub-circuit via a first node and the signal output lead is electrically connected with the first node to output detected electrical signals.

2. The photoelectric detection circuit of claim 1, wherein the first detection sub-circuit comprises a first photoelectric sensing element,
the second detection sub-circuit comprises a second photoelectric sensing element, and
the first photoelectric sensing element and the second photoelectric sensing element have same electrical characteristics.

3. The photoelectric detection circuit of claim 2, further comprising a first power end and a second power end,
wherein a first end of the first photoelectric sensing element is electrically connected to the first power end,
a second end of the second photoelectric sensing element is electrically connected to the second power end, and
a second end of the first photoelectric sensing element and a first end of the second photoelectric sensing element are both electrically connected to the first node.

4. The photoelectric detection circuit of claim 3, wherein an output potential of the first power end is higher than an output potential of the second power end.

5. The photoelectric detection circuit of claim 3, wherein an output potential of the first power end and an output potential of the second power end have opposite polarities and equal magnitudes.

6. The photoelectric detection circuit of claim 3, further comprising a third power end and a fourth power end,
wherein a control terminal of the first photoelectric sensing element is electrically connected to the third power end; and
a control terminal of the second photoelectric sensing element is electrically connected to the fourth power end.

7. The photoelectric detection circuit of claim 6, wherein an output potential of the third power end and an output potential of the fourth power end are a same output potential, and
a control terminal of the first photoelectric sensing element and a control terminal of the second photoelectric sensing element are under control of the same output potential such that the first photoelectric sensing element and the second photoelectric sensing element stay in off state.

8. The photoelectric detection circuit of claim 2, wherein the first photoelectric sensing element comprises a first thin film transistor, and the second photoelectric sensing element comprises a second thin film transistor.

9. The photoelectric detection circuit of claim 8, wherein the first thin film transistor comprises a first active layer, the second thin film transistor comprises a second active layer, and the first active layer and the second active layer are formed of a same semiconductor material.

10. The photoelectric detection circuit of claim 9, wherein the semiconductor material comprises one or more selected from the group consisting of amorphous silicon, polysilicon or metallic oxide.

11. The photoelectric detection circuit of claim 9, wherein the first active layer and the second active layer are formed of a same semiconductor layer.

12. The photoelectric detection circuit of claim 1, wherein the second detection sub-circuit is blocked to prevent the light to be detected from the environment from illuminating the second detection sub-circuit such that the second detection sub-circuit is in a state the fixed illumination intensity.

13. A photoelectric detection device comprising the photoelectric detection circuit of claim 1.

14. The photoelectric detection device of claim 13, further comprising a processing circuitry, wherein the processing circuitry is configured to detect variation of electrical signals output by the signal output lead and perform subsequent processing on the electrical signals.

15. The photoelectric detection device of claim 13, further comprising a base substrate, wherein the first detection sub-circuit and the second detection sub-circuit are disposed in a same layer with respect to the base substrate.

16. The photoelectric detection device of claim 15, further comprising a light blocking element, wherein the light blocking element overlaps the second detection sub-circuit to block light incident onto the photoelectric detection device from illuminating the second detection sub-circuit, and the first detection sub-circuit is exposed to allow light to be incident onto the photoelectric detection device to illuminate the first detection sub-circuit.

17. The photoelectric detection device of claim 13, further comprising a base substrate, wherein the first detection sub-circuit and the second detection sub-circuit are stacked up with respect to the base substrate, and the first detection sub-circuit is disposed on the second detection sub-circuit thereby light incident on the photoelectric detection device is blocked and is not capable of illuminating the second detection sub-circuit.

18. The photoelectric detection device of claim 17, further comprising a light blocking element, wherein the light blocking element is disposed between the first detection sub-circuit and the second detection sub-circuit and overlaps the second detection sub-circuit to block light incident onto the photoelectric detection device from illuminating the second detection sub-circuit.

19. An electronic device comprising the photoelectric detection device of claim 13.

20. The electronic device of claim 19, wherein the electronic device is a display panel comprising a display area, wherein the photoelectric detection device is disposed outside of or in the display area.

\* \* \* \* \*